H. S. ASHENHURST.
REINFORCED INSULATING MATERIAL.
APPLICATION FILED DEC. 30, 1918.
1,353,622.
Patented Sept. 21, 1920.
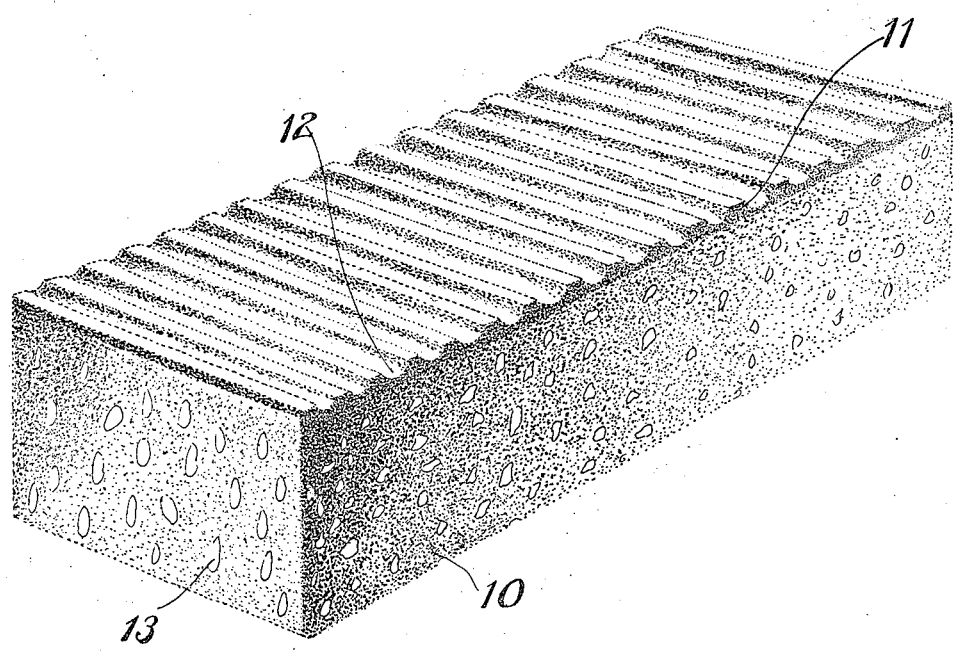
Inventor
Harold S. Ashenhurst
By Chas. F. Murray
His Atty.

UNITED STATES PATENT OFFICE.

HAROLD S. ASHENHURST, OF CHICAGO, ILLINOIS, ASSIGNOR OF FOUR-FIFTHS TO JAMES J. REYNOLDS, OF CHICAGO, ILLINOIS.

REINFORCED INSULATING MATERIAL.

1,353,622.      Specification of Letters Patent.    Patented Sept. 21, 1920.

Original application filed April 29, 1918, Serial No. 231,371. Divided and this application filed December 30, 1918. Serial No. 268,976.

*To all whom it may concern:*

Be it known that I, HAROLD S. ASHENHURST, a citizen of the United States, and resident of Chicago, in the county of Cook and State of Illinois, have invented certain new and useful Improvements in Reinforced Insulating Material, of which the following is a specification.

This application is a division of my application, Serial No. 231,371, filed April 29, 1918.

My invention relates to a heat insulating material and particularly to an improvement on the article disclosed in my Patent No. 1,230,085, of June 12, 1917.

One of the objects of the present invention is to provide a material which will more perfectly withstand a direct flame or high degree of heat directly applied without disintegrating the structure. One of the difficulties in the use of an insulating material, and particularly the material disclosed in my patent referred to is that the structure, while very efficient as an insulating material, tends to break down under a high degree of direct heat. To avoid this difficulty I have devised a method of reinforcing the structure by means of which even the highest degree of heat directly applied is resisted without interfering with the structure of the main body thereof. I am aware that it is not new to apply a strip of asbestos paper to insulating material after the material has been formed. My improvement, however, contemplates the application of the reinforcing surface during the process of manufacture of the main body of the structure and when so applied it is perfectly bonded and is in effect an integral part of the structure.

In the application of the improvement to the structure disclosed in my patent, the mixture is made and the material is allowed to expand and partially harden, whereupon I spread upon one surface of the body of the material a coating of plastic asbestos fiber formed by mixing short fiber asbestos with sufficient water to make the same plastic. Preferably the surface is then corrugated or recessed by passing a suitable tool thereover. It is then allowed to dry or harden, after which it will be found that the corrugated fiber coating is firmly bonded with the main body of the material and is for all practical purposes an integral part thereof.

The plastic asbestos substance employed for coating the material as described herein is best recovered from the sand which forms the residue from asbestos mills. When this sand has been properly treated a product is secured which is very plastic, has a relatively great covering capacity, adheres firmly and does not shrink or crack when dried.

The physical characteristics of the substance are as follows:

It is a nearly white, fluffy mass, softly fibrous to the touch and entirely free from gritty particles even when viewed under a microscope. The majority of the particles are in the form of monoclinic crystals which because of their unbroken smoothness, cannot be mechanically bound together or felted. Chemical analysis proves this product to be a double silicate of magnesium and calcium containing appreciable quantities of alkaline silicates. When water is added to such a product the soluble silicates pass into solution and this solution filters in between the fibers. These alkaline silicates are very weakly basic and the silica therein may be displaced by as weak an acid as carbon dioxid. Since the air and possibly the water contains considerable quantities of this acid, the silica in the aqueous solution is displaced from its salts and free silicic acid is precipitated acting as a binder and serving to cement the fibers at their intersections.

The acid before precipitation is presumably the metasilicic; assuming the solution to contain the sodium salt, the reaction proceeds as follows:

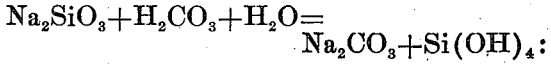

On heating the gelatinous precipitate of silicic acid, or after the mass has dried, it contains a smaller proportion of the elements of water and the reaction proceeds as follows:

Further heating or drying over a protracted period results in the formation of silica dioxid, which is the final product.

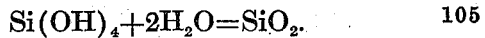

The substance and the method of producing the same are fully described and claimed in co-pending applications Ser. Nos. 262,953 and 262,954, both filed Nov. 18, 1918.

In the drawings the figure is a perspective view of a block of the material formed in accordance with my invention.

The body 10, of the material is composed of asbestos, sand or waste from asbestos mills combined with sulfate of aluminum and calcium carbonate. In practice these materials will be suitably mixed in a dry state. A quantity of water is then added sufficient to form a paste, whereupon a reaction begins in which a quantity of carbon dioxid is released. This serves to materially increase the size of the body because of the formation of a multitude of cells in the structure. After the reaction is completed a hardening process sets in and before it is complete, the surface of the block or body of the material is covered with a coating of short fiber asbestos as heretofore described, which has been mixed with water until it is in a pasty condition. This coating is then applied to the block as indicated at 11, the thickness being determined by the use to which the article is to be put, whereupon a suitable tool is passed over the body of material forming corrugations or recesses therein. This last step may or may not be included, as desired. Where, however, the article is to be placed against a heated surface, the corrugations will be found to be desirable as will readily be understood. The shape and disposition of the recesses may be readily controlled as the material is at that time very plastic.

While the illustration is that of a block of the material it will be understood that the same advantages accrue in the construction of a circular or other shaped body of the material. For instance, in the construction of pipe coverings it may be found desirable to coat the inner surface of the covering with the asbestos cement as heretofore specified and this may readily be accomplished in the manner described. The advantage in the formation of material such as described is that of the ease and simplicity in which the reinforcement is applied and of the nature of the bond after the elements have hardened by drying. The protective coating of fiber asbestos will be found to be substantially an integral part of the main body of the material and the same advantages will be present as where the entire body of the material is composed of long fiber asbestos; in fact, a greater heat insulating capacity is found in the present structure than in one composed entirely of asbestos, the cells indicated by the openings 13, which are present throughout the body of the material, serving as voids which successfully resist the transfer of heat. The structure when so formed is extremely light having a specific gravity of substantially .5 although this may be varied by changing the proportions of the ingredients.

If the coating is to be capable of resisting extreme degrees of heat, such as that of molten metal, I may prefer to add a quantity of sodium silicate instead of water to the asbestos fiber used in the surface coat approximately half and half of each ingredient, by weight, being employed.

It will be understood, however, that the invention is not limited to the use of the protective coating on a body of material constructed as described herein but may be applied to advantage to various heat insulating bodies. The principal feature of importance is that it can be applied during the process of manufacture of the body as in that manner it may be caused to adhere tightly thereto without the use of binding means.

I claim:

As a new article of manufacture, a body of porous insulating material having a ribbed surface composed of fiber asbestos permanently joined to the body during the process of manufacture thereof.

Signed at Chicago, Ill., this 17th day of December, 1918.

HAROLD S. ASHENHURST.

Witness:
T. D. BUTLER.